United States Patent [19]

Hughes et al.

[11] Patent Number: 4,591,849

[45] Date of Patent: May 27, 1986

[54] LIQUID CRYSTAL DISPLAYS

[75] Inventors: Anthony J. Hughes, Malvern; Frances C. Saunders, Malvern Wells; Ian A. Shanks, Bedford, all of England

[73] Assignee: The Secretary of State for Defence in Her Britannic Majesty's Government of the United Kingdom of Great Britain and Northern Ireland, London, England

[21] Appl. No.: 465,546

[22] Filed: Feb. 10, 1983

[30] Foreign Application Priority Data

Feb. 19, 1982 [GB] United Kingdom ............... 8204892

[51] Int. Cl.⁴ ............................................. G09G 3/36
[52] U.S. Cl. ................................. 340/784; 340/765; 340/805; 340/811; 350/332
[58] Field of Search ............... 340/784, 765, 763, 783, 340/805, 811; 350/332; 368/239, 240, 242

[56] References Cited

U.S. PATENT DOCUMENTS

| | | | |
|---|---|---|---|
| 3,891,307 | 6/1975 | Tsukamoto et al. | 340/784 |
| 3,973,252 | 8/1976 | Mitomo et al. | 340/784 |
| 3,976,362 | 8/1976 | Kawakami | 340/784 |
| 4,050,064 | 9/1977 | Hashimoto et al. | 340/784 |
| 4,359,729 | 11/1982 | Nonomura et al. | 340/784 |
| 4,380,008 | 4/1983 | Kawakami et al. | 340/784 |
| 4,465,999 | 8/1984 | Tsuzuki et al. | 340/805 |

Primary Examiner—Gerald L. Brigance
Assistant Examiner—Jeffery A. Brier
Attorney, Agent, or Firm—Stevens, Davis, Miller & Mosher

[57] ABSTRACT

A liquid crystal display includes a liquid crystal cell formed by enclosing a thin layer of a cholesteric liquid crystal material between two slides. A set of electrode structures is formed on each slide so that voltages may be applied to the liquid crystal material causing an observable display effect. Voltages are supplied to the electrodes in sequence by driver electronics under the control of a logic unit which also controls a variable voltage source supplying voltages to the driver electronics. The logic unit controls the drive electronics to give an R.M.S. voltage $V_x$ at elements required to be at an OFF state and an R.M.S. voltage $V_c$ higher than $V_x$ at elements required to be in an ON state. The logic unit also controls the voltage source to reduce its voltage output to both OFF and ON elements simultaneously while maintaining the ratio of $V_x$ and $V_c$ for a period while information displayed is to be changed.

7 Claims, 4 Drawing Figures

LIQUID CRYSTAL DISPLAYS

FIELD OF THE INVENTION

This invention relates to liquid crystal display devices.

BACKGROUND OF THE INVENTION

A typical liquid crystal display device comprises two glass slides spaced 6-12 μm apart enclosing a layer of a liquid crystal material. Electrode structures on the inner face of the slides enable an electric field to be applied across the layer of liquid crystal material.

There are three types or phases of liquid crystal material, cholesteric, nematic, and smectic. This invention concerns cholesteric type material which may use a mixture of natural cholesteric material diluted with nematic material to obtain the desired cholesteric pitch. In a cholesteric material the molecules are arranged in a helical form whose natural pitch can be increased by the addition of a nematic material.

One known type of display utilizes a cholesteric material in a phase change effect. When a suitable electric field is applied to the cholesteric material it causes the molecules to rotate to lie along the applied field, its ON state. This ON state is similar to the ON state of a nematic liquid crystal material and accounts for the device being termed a phase change (cholesteric to nematic) device. On removing the electric field the liquid crystal relaxes back to its cholesteric, OFF, state.

In its OFF state a phase change device is light scattering. Pleochroic dyes may be dissolved in the liquid crystal material so the OFF state is coloured. In the ON state dye molecules, aligned parallel to the liquid crystal molecules by the known guest host effect, do not absorb light and so the display is transparent.

This dyed phase change device is useful because it has a good viewing angle, brightness and ON/OFF contrast ratio. It also has a fast turn-OFF time determined by the cholesteric concentration in the liquid crystal material.

Liquid crystal displays may have their electrodes arranged in, e.g., a row and column matrix; one slide has m row strip electrodes and the other slide has n column strip electrodes forming an m×n number of intersections. The intersections form elements of a display, in this case an m×n element matrix. Each element can be addressed, i.e., have a voltage applied to it, by voltages applied to appropriate row and column electrodes.

A matrix display can be addressed one element at a time, but more often is addressed a line at a time. This is termed multiplexing. A voltage is applied to each row electrode in turn and simultaneously a suitable voltage is applied to selected column electrodes so that all selected element intersections in that row are turned ON. After addressing the whole matrix the addressing is repeated or refreshed for as long as information is to be displayed. The display may also be driven using the correlation properties of the row and column drive waveforms (Nehring, J. Kmetz, A. R., I.E.E.E. Trans. ED, Vol. ED-26 (1979), Pages 795-802). Phase change displays are difficult to matrix or multiplex address because of the time taken for an intersection to turn from ON and OFF. Normally, the turn OFF time is short in comparison to a display refresh time but can be increased by applying a voltage close to a threshold sustaining value to the elements. Threshold voltage is the voltage at which a material reaches its ON state.

Two main types of approaches have been made to multiplexing: a slow and a fast scan method.

In the slow scan method each intersection (element) or line of elements is addressed for a time long enough for the elements to change during their address period. When elements are not being addressed they are sustained in either the ON or OFF state by a voltage close to threshold. This method has the disadvantage of possessing a time lag between a decision being made to change elements and an occurrence of the addressing periods for these elements. Special techniques must also be used in order to turn OFF a previously ON element in a reasonable time.

In the fast scan or RMS method each element or line of elements is addressed for a time much shorter than its response time and this is repeated rapidly so that an RMS voltage above threshold is maintained at ON elements and an RMS voltage below but close to threshold is maintained on OFF elements. This method, when applied to dyed phase change displays, suffers from a long turn OFF time caused by the sustaining effect of the OFF RMS voltage which makes it difficult to change displayed information quickly. Also, the voltage at recently OFF elements causes the dyes to be less absorbing than at elements OFF for longer periods and areas of the display receiving zero voltage, i.e., the areas not covered by electrodes.

SUMMARY OF THE INVENTION

An object of this invention is to provide a multiplex addressed phase change display capable of quickly changing its displayed information.

According to this invention a method of addressing a phase change liquid crystal display device comprises the steps of repeatedly applying a voltage signal in sequence between two sets of electrodes whereby selected intersections of the two sets of electrodes receive an above threshold value RMS and unselected intersections receive a below threshold value signal, the method being characterised by the step of reducing the RMS amplitude of both ON and OFF voltage signals while maintaining the ratio between them for a period such that the ON voltage signal is reduced below threshold during that period each time displayed information is to be changed.

The voltage level and/or period of application may be varied to given an rms value of reduced voltage.

According to this invention a liquid crystal display comprises a liquid crystal cell formed by enclosing a thin layer of a cholesteric liquid crystal material between two slides each bearing an electrode structure set arranged to provide a plurality of overlapping electrode intersections forming elements, drive electronics for selectively applying voltages to each electrode set and for causing elements to change between an OFF state and an ON state, control logic for controlling the drive electronics to give an R.M.S voltage $V_x$ at elements required to be at an OFF state and an R.M.S. voltage $V_c$ higher than $V_x$ at elements required to be in an ON state, and a variable voltage supply source, the arrangement being such that voltages are applied to the electrodes in each set in sequence causing selected elements to collectively display information, characterised in that the voltage level is reduced for a while to both ON and OFF elements to reduce the time required by elements to change from an ON to an OFF state whilst ON elements remain substantially ON. Pleochroic dyes may be dissolved in the cholesteric material. The cholesteric material may comprise nematic liquid crystal material plus a cholesteric liquid crystal material or a material which forms a cholesteric mixture when added to a nematic material.

BRIEF DESCRIPTION OF THE DRAWINGS

The invention will now be described, by way of example only, with reference to the accompanying drawings of which.

DETAILED DESCRIPTION OF THE INVENTION

Figure 1:
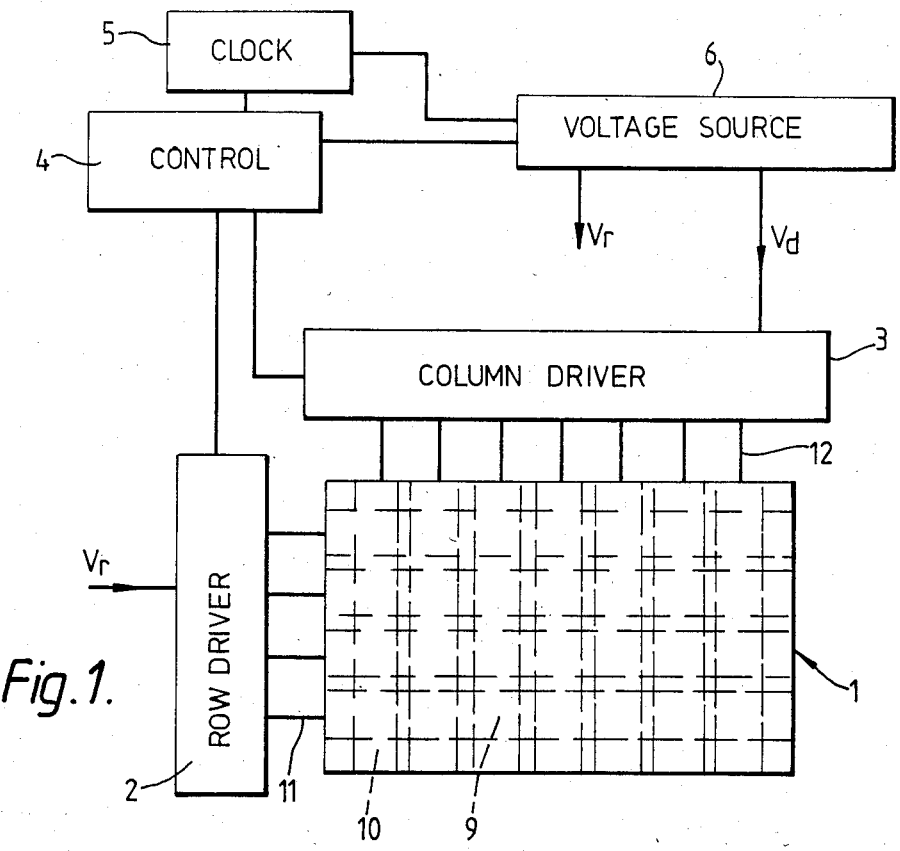
FIG. 1 is a front view of a liquid crystal display and associated drive electronics.
Figure 2:
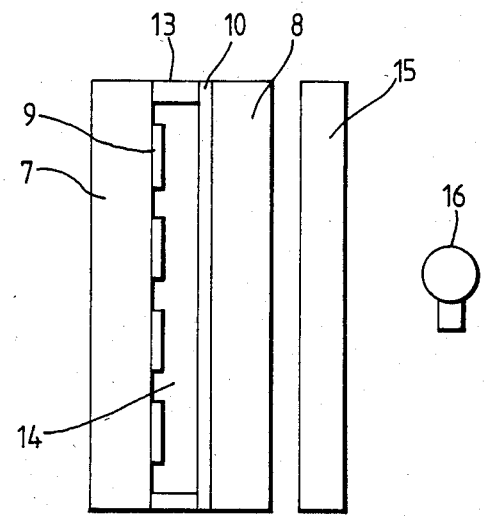
FIG. 2 is a cross sectional view of the liquid crystal device of FIG. 1.

The display of FIGS. 1, 2 comprises a liquid crystal cell 1 connected to row and column drive electronics 2, 3, controlled by a central control logic 4 which receives timing pulses from a clock 5. The drive electronics 2, 3 receive variable voltage supplied Vr, Vd, from a voltage source 6.

The liquid crystal cell 1 comprises two glass slides 7, 8 coated on their inner faces with row and column strip electrodes 9, 10 of tin oxide. Each electrode has a separate connection 11, 12, to a drive electronics 2, 3. A spacing ring 13 locates the slides 7, 8, 6 μm apart. A 6 μm thick layer 14 of cholesteric liquid crystal material is sealed between the slides 7, 8, and spacers 13. A reflector 15 or a light source 16 may be arranged behind the cell 1 so that it may be used in a transmissive or reflective mode.

Prior to assembly the slides inner faces are surface treated by evaporation of SiO at a grazing angle of 30° to give a homogeneous boundary condition with the liquid crystal material. A suitable liquid crystal material for a 6 μm thick layer is 9% CB 15 (a cholesteric material) in E43 (a nematic material) both available from B. D. H. Ltd., Poole, England.

CB 15 has the structure:

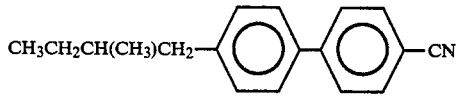

E 43 contains the following structures:

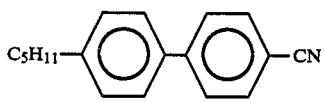

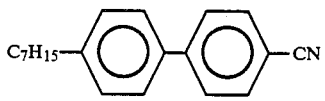

-continued

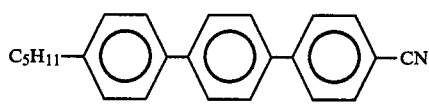

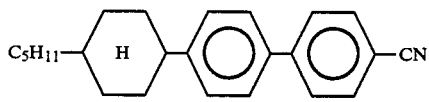

A blue dye such as described in U.K. Patent Application No. 2,081,736 A may be dissolved in the above mixture. This has the structure:

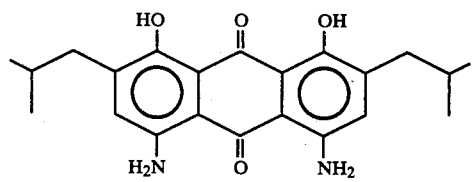

Other colours of dyes may be used, e.g., the red or yellow dyes described in U.K. Patent Application No. 2,093,475 A. These have the structure

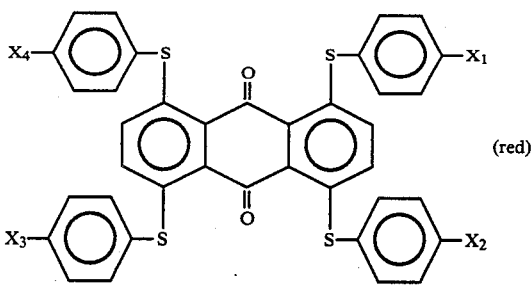

(red)

where $X_1 X_2 X_3 X_4$ are tertiary or hydrogen independently

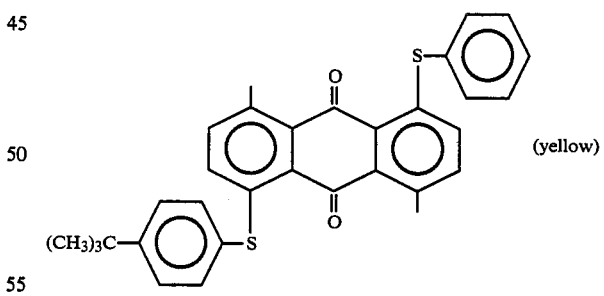

(yellow)

In the cell of FIG. 1 there are seven column electrodes and four row electrodes. The intersection of a column and a row electrode form an element that can be switched between a cholesteric OFF state and a nematic ON state by application of an electric signal across the two electrodes. A 7×4 array gives a 28 element display. In practice much larger displays can be made. The number of rows is limited by the liquid crystal material as is described below. The number of columns can be extended considerably and is limited only by electrical complexity when line at a time multiplexing is used.

Figure 4:
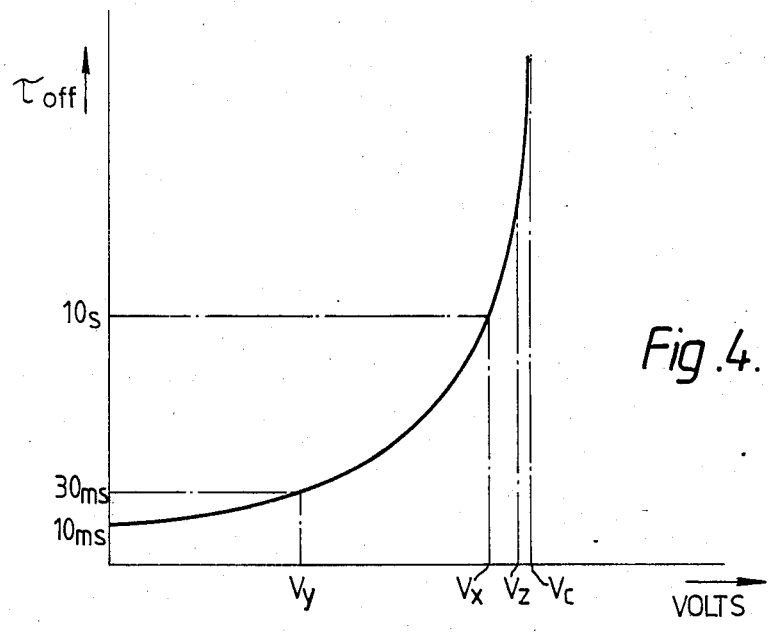
FIGS. 3, 4 are graphs showing some characteristics of the device of FIGS. 1, 2.
Figure 3:
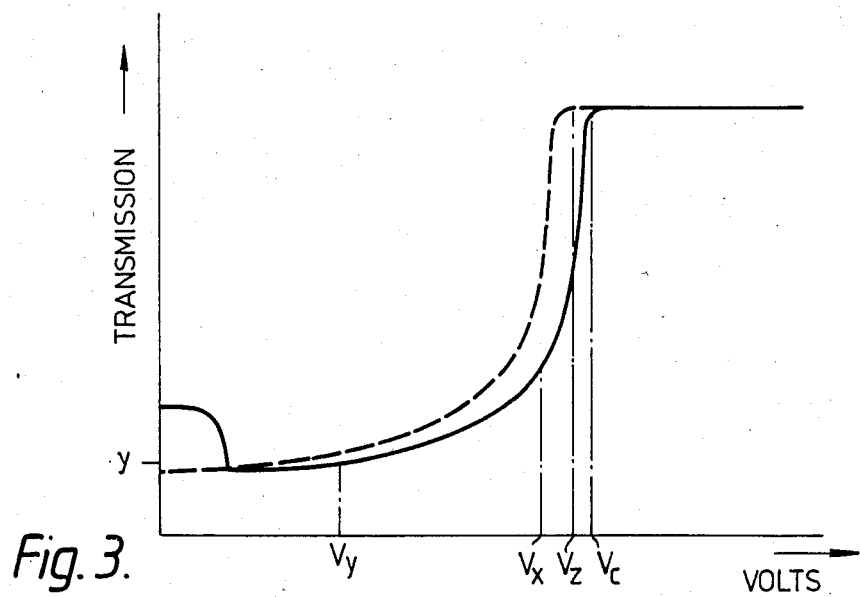

The behaviour of a liquid crystal element in response to an applied electric field is shown in FIGS. 3, 4. With zero applied voltage across an element, the OFF state, only a small amount of light is transmitted. Light transmission increases slowly as applied voltage increases above zero until a value $V_x$ is reached. Above $V_x$ transmission increases considerably over a small voltage range. At a threshold value marked $V_c$ the cell is almost completely ON. Above this the cell is completely ON.

The curve of FIG. 3 is temperature dependent, the curve being displaced to the left for increasing temperatures. Also the curve of FIG. 3 is different for decreasing voltages; the broken curve indicates transmission during slowly decreasing voltages. The horizontal distance between the increasing and decreasing voltage curves is hysteresis which must be reduced as far as possible by appropriate selection of liquid crystal material and layer thickness, and slide surface preparation. Using the above cell and material the fully ON voltage is about 10.5 volt and the hysteresis is about 1.5 volts.

FIG. 4 shows the delay $\tau_{off}$ in a liquid crystal material for various steady voltages, $\tau_{off}$ being the time taken to turn from ON to OFF in the presence of these voltages. The value of $\tau_{off}$ for a given voltage will depend on the particular liquid crystal material; increasing the cholesteric content reduces $\tau_{off}$. As the applied voltage approaches $V_c$, $\tau_{off}$ becomes very large. With zero voltage applied $\tau_{off}$ is about 10 m.sec. For the addressing technique described above elements required to be OFF receive an r.m.s. voltage (marked $V_x$) below threshold; the reason for this value is that all OFF elements in each row receive a row voltage pulse once per refresh period. For a typical case the value of $\tau_{off}$ at OFF ($V_x$) elements is around 10 seconds. This means that it takes about 10 seconds to change displayed information. Additionally, as shown in FIG. 3 at $V_x$, the material is not quite in its OFF state. This gives rise to a patchy appearance in the display and to a reduced contrast.

To decrease the $\tau_{off}$ and improve appearance, the voltages applied to the cell 1 are reduced in value for a period long enough to reduce the r.m.s value of applied voltage. The lower the reduced r.m.s. voltage the lower the value of $\tau_{off}$. By careful choice of reduced voltage and its length of application, elements previously ON and required to be OFF can be turned OFF in about 30 msec by an r.m.s. up to voltage $V_y$. In the meantime, elements required to be ON receive a voltage $V_z$ at a sustaining level below $V_c$ where $\tau_{off}$ has a high value. Thus, ON elements can remain ON without a flickering effect. Also, OFF elements turn more fully OFF with the reduced voltage. This is marked y on FIG. 3. After the period of reduced voltage, On elements receive $V_c$ r.m.s. and OFF elements $V_x$ r.m.s. This voltage $V_x$ means OFF elements will gradually turn towards ON, at x on FIG. 3. Therefore, the cell voltage is preferably periodically reduced even when no information is to be changed.

In operation, to display information the voltage to be applied across an element is divided into a row voltage applied to row electrodes 9, $V_r$, and a data voltage, $V_d$, applied to the column electrodes 10 in an optimized ratio described by Alt and Pleshko (Alt, P. M., Pleshko, P., I.E.E.E. Trans. ED, Volume ED-21 (1974) Pages 146-155). A row at a time is addressed by applying $V_r$ to a row electrode 9 and simultaneously applying data voltages $V_d$ to appropriate column electrodes 10. Each row 9 is similarly addressed until all four rows have been addressed. This is repeated until new information is to be displayed. Each ON element receives an r.m.s. voltage of $V_c$ or greater and each OFF element received an r.m.s. voltage of $V_x$. The various voltages are applied in a conventional manner by the drive electronics 2, 3 fed by the voltage source 6 and the control logic 4.

When information is changed, the level of voltage supplied by the voltage supply is dropped. This results in an r.m.s. voltage of $V_z$ at ON elements and $V_y$ at OFF elements. In consequence, ON elements required to go do so in typically 30 msec. and ON elements are sustained in the ON state. After an adjustable period of reduced voltage the original voltage level is renewed. The value of reduced voltage supply and length of application are adjusted for fast turn off and greater contrast without unacceptable flickering of ON elements.

The above reduction in supply voltage may also be used to improve contrast even when no information is to be changed.

In one example, a 7 column by 4 row cell, the value of the threshold voltage voltage $V_c$ was measured as 12.1 volts r.m.s. The values of $V_r$ and $V_d$ were set at 14 V and 7 V. Row address time was 1 ms and refresh time 4 ms. The polarity of $V_r$ and $V_d$ was reversed every 0.5 m.s. to ensure A.C. supply to the liquid crystal. The value of supply voltage was dropped to about 0.7 $V_c$ for a time of about 25 ms. This gave an improved turn OFF time without appreciable flicker.

Since the voltage levels are quite critical, the levels may require adjusting if the liquid crystal temperature varies appreciably.

In larger displays, the values of supply voltage drop and times of application vary with materials and number of row and column electrode. Typically, the supply voltage at ON elements is dropped to 0.9 $V_c$ or less for up to about 30 msec. The combination of voltage drop and length of application is arranged to give a substantially flicker free displays. In some display the R.M.S. value at the ON element is reduced to between $V_c$ and $V_x$ or even below $V_x$.

I claim:

1. A method of addressing a phase change liquid crystal display device comprising the steps of repeatedly applying a voltage signal in sequence between two sets of electrodes whereby selected intersections of the two sets of electrodes receive an above threshold value R.M.S. and unselected intersections receive a below threshold value signal, wherein the improvement comprises the step of reducing the R.M.S. amplitude of both ON and OFF voltage signals while maintaining the ratio between them for a period such that the ON voltage signal is reduced below threshold during that period each time displayed information is to be changed.

2. A liquid crystal display comprising a liquid crystal cell formed by enclosing a thin layer of a cholesteric liquid crystal material between two slides each bearing an electrode structure set arranged to provide a plurality of overlapping electrode intersection forming elements, drive electronics for selectively applying voltages to each electrode set such that voltages are applied to the electrodes in each set in sequence causing selected elements to change between an OFF state and an ON state to collectively display information, a variable voltage source for supplying voltages to the drive electronics, and control logic for controlling the drive electronics to give an R.M.S. voltage $V_x$ at elements required to be at an OFF state and an R.M.S. voltage $V_c$ higher than $V_x$ at elements required to be at an ON state, and for controlling the voltage source to reduce its voltage output to both OFF and ON elements simultaneously while maintaining the ratio of $V_x$ and $V_c$ for a period while information displayed is to be changed, said period being not less than a time taken to address elements to be changed and less than 30 milliseconds.

3. The display according to claim 2 wherein the voltage output of the voltage source during said period of reduced voltage provides an RMS voltage at ON elements of less than 0.9 $V_c$ but greater than zero, where $V_c$ comprises a threshold RMS value at which a cell of said cholesteric liquid crystal material is almost completely ON.

4. The display according to claim 2 wherein the voltage output of the voltage source during said period of reduced voltage provides an RMS voltage at ON elements between $V_c$ and $V_x$, where $V_c$ comprises a threshold RMS value at which a cell of said cholesteric liquid crystal material is almost completely ON and $V_x$ comprises an RMS value below which light transmission increases slowly as applied voltage increases and above which light transmission increases greatly over a small voltage range as applied voltage increases.

5. The display according to claim 2 wherein the level of the reduced voltage output is adjustable.

6. The display according to claim 2 wherein the length of the period of reduced voltage output is adjustable.

7. The display according to claim 2 wherein the period of reduced voltage output is repeated periodically irrespective of changes to display information.

* * * * *